US008677337B2

(12) United States Patent
Song et al.

(10) Patent No.: US 8,677,337 B2
(45) Date of Patent: Mar. 18, 2014

(54) STATIC PROFITABILITY CONTROL FOR SPECULATIVE AUTOMATIC PARALLELIZATION

(75) Inventors: Yonghong Song, Palo Alto, CA (US); Spiros Kalogeropulos, Los Gatos, CA (US); Partha P. Tirumalai, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1676 days.

(21) Appl. No.: 12/113,716

(22) Filed: May 1, 2008

(65) Prior Publication Data

US 2009/0276758 A1 Nov. 5, 2009

(51) Int. Cl.
*G06F 9/45* (2006.01)

(52) U.S. Cl.
USPC ............................. 717/159; 717/160; 717/152

(58) Field of Classification Search
USPC .......................................... 717/159, 160, 152
See application file for complete search history.

(56) References Cited

U.S. PATENT DOCUMENTS

| 6,651,246 | B1 | 11/2003 | Archambault et al. | |
|---|---|---|---|---|
| 6,654,954 | B1 | 11/2003 | Hicks | |
| 6,880,045 | B2 | 4/2005 | Pong et al. | |
| 6,938,130 | B2 | 8/2005 | Jacobson et al. | |
| 7,395,531 | B2 | 7/2008 | Eichenberger et al. | |
| 7,426,724 | B2 | 9/2008 | Kilgard et al. | |
| 7,530,069 | B2 * | 5/2009 | Kawahara et al. | 718/100 |
| 7,543,282 | B2 | 6/2009 | Chou | |
| 7,818,729 | B1 | 10/2010 | Plum et al. | |
| 7,853,934 | B2 | 12/2010 | Partamian | |
| 8,046,745 | B2 * | 10/2011 | Wong | 717/130 |
| 2004/0049667 | A1 | 3/2004 | McCormick et al. | |
| 2005/0097509 | A1 * | 5/2005 | Rong et al. | 717/106 |
| 2006/0026575 | A1 | 2/2006 | Cabillic et al. | |
| 2006/0026580 | A1 | 2/2006 | Cabillic et al. | |
| 2007/0050762 | A1 | 3/2007 | Chen et al. | |
| 2007/0169057 | A1 * | 7/2007 | Silvera et al. | 717/160 |
| 2008/0163185 | A1 | 7/2008 | Goodman | |

OTHER PUBLICATIONS

Song, Y., et al; "Design and Implementation of a Compiler Framework for Helper Threading on Multi-Core Processors;" IEEE PACT 2005, (Sep. 2005); pp. 99-109.

(Continued)

*Primary Examiner* — Qamrun Nahar
(74) *Attorney, Agent, or Firm* — Rory D. Rankin; Meyertons, Hood, Kivlin, Kowert & Goetzel, P.C.

(57) ABSTRACT

A compilation method and mechanism for parallelizing program code. A method for compilation includes analyzing source code and identifying candidate code for parallelization. Having identified one or more suitable candidates, the profitability of parallelizing the candidate code is determined. If the profitability determination meets a predetermined criteria, then the candidate code may be parallelized. If, however, the profitability determination does not meet the predetermined criteria, then the candidate code may not be parallelized. Candidate code may comprises a loop, and determining profitability of parallelization may include computing a probability of transaction failure for the loop. Additionally, a determination of an execution time of a parallelized version of the loop is made. If the determined execution time is less than an execution time of a non-parallelized version of said loop by at least a given amount, then the loop may be parallelized. If the determined execution time is not less than an execution time of a non-parallelized version of said loop by at least a given amount, then the loop may not be parallelized.

15 Claims, 12 Drawing Sheets

(56) References Cited

OTHER PUBLICATIONS

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

"Design and Evaluation of Dynamic Optimizations for a Java Just-in-Time Compiler", Suganuma, et al., Jul. 2005, pp. 732-785, http://delivery.acm.org/10.1145/1080000/1075386/p732-suganuma.pdf.

"Compiler Optimization of Embedded Applications for an Adaptive SoC Architecture", Hardnett, et al., Oct. 2006, pp. 312-322, http://delivery.acm.org/10.1145/1180000/1176798/p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

* cited by examiner

STATIC PROFITABILITY CONTROL FOR SPECULATIVE AUTOMATIC PARALLELIZATION

BACKGROUND OF THE INVENTION

1. Field of the Invention

This invention relates to computing systems and, more particularly, to multithreaded processing systems.

2. Description of the Related Art

Multi-core chips have become increasingly popular in recent years. In order to take advantage of these multi-core chips, efforts to parallelize sequential applications may be undertaken. One approach to parallelization is compiler based automatic parallelization which attempts to parallelize programs, either sequential or explicitly parallel, automatically. For example, given a loop, if the compiler can prove that there exists no inter-loop data dependences, the loop can be parallelized. Otherwise, the loop may not be parallelized. Because the compiler has to be conservative to ensure correctness, there are loops which actually do not have inter-loop data dependence but are not parallelized because the compiler cannot prove there is no inter-loop data dependence. If such loops could somehow be parallelized, additional speedup may be achieved at runtime.

Hardware transactional memory, for which development is under investigation by several vendors, is a hardware extension to support better multi-threaded application development. Various research projects have demonstrated transactional memory can greatly reduce lock contention and hence improve multi-threaded application performance. However, little research has been done on transactional memory to help parallelize programs. Previous efforts have investigated a compiler framework to generate code for speculative automatic parallelization with hardware transactional memory. For example, thread-level speculation (TLS) has been proposed as a means to parallelize difficult-to-analyze serial codes. While speculative thread-level automatic parallelization has the potential to improve performance, uncontrolled parallelization may hurt performance if the parallelization overhead is greater than the benefit. In view of the above, effective methods and mechanisms for improving parallelization efforts are desired.

In view of the above, effective methods and mechanisms for improving parallelization efforts are desired.

SUMMARY OF THE INVENTION

Methods and mechanisms for profitability control for speculative parallelization of program code are contemplated.

A method for compilation includes analyzing source code and identifying candidate code which may be suitable for parallelization. Having identified one or more suitable candidates, a determination as to the profitability of parallelizing identified candidate code is made. If the determined profitability meets a predetermined or otherwise desired criteria, then the candidate code may be parallelized. Such criteria may include comparing a cost of overhead to predicted speedup of execution. If, on the other, the determined profitability does not meet the predetermined or desired criteria, then the candidate code may be discarded as a candidate for parallelization.

In various embodiment, identified candidate code may comprises a loop, and determining the profitability of parallelizing the loop may include computing a probability of transaction failure for the loop. Additionally, a determination of a runtime execution time of a parallelized version of the loop is made. If the determined runtime execution time is less than an execution time of a non-parallelized version of said loop by at least a given amount, then the loop may be parallelized. If the determined execution time is not less than an execution time of a non-parallelized version of said loop by at least a given amount, then the loop may not be parallelized. Additionally, if it is determined that loop includes a transaction that will fail on each iteration of the loop, then the loop may be discarded as a candidate for parallelization of said loop.

Also contemplated are embodiments wherein in response to determining the loop does not include a transaction that will fail on each iteration of the loop, the method may further include forgoing parallelization of said loop, if it is determined a resource limitation will be reached on a single iteration of said loop. If it is determined such a resource limitation will not be reached on a single iteration of said loop, a case a sub-group size may be computed such that work with such a sub-group size will be shared among a plurality of threads.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Figure 1:
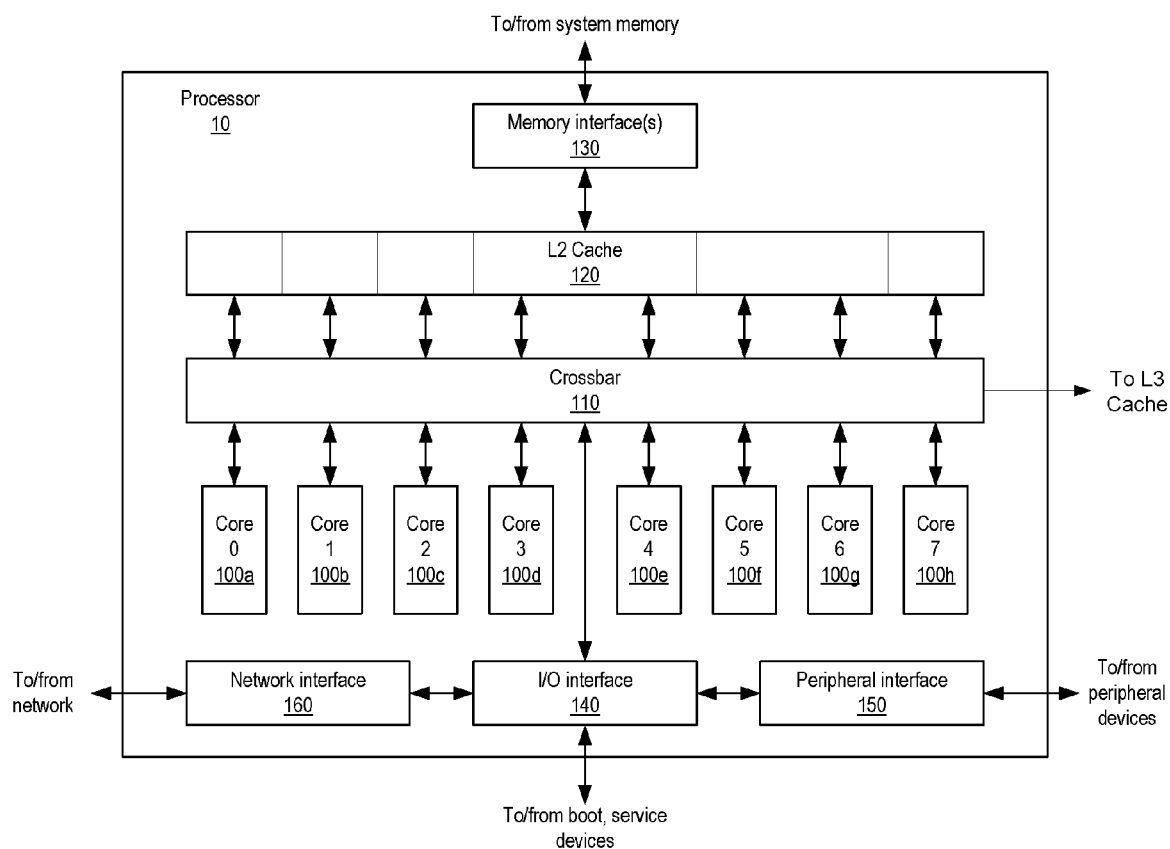
FIG. 1 is a block diagram illustrating one embodiment of a multi-threaded multi-core processor.

A block diagram illustrating one embodiment of a multi-threaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation—or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

While the embodiment of FIG. 1 depicts a processor which includes eight cores, the methods and mechanisms described herein are not limited to such micro-architectures. For example, in one embodiment, a processor such as the Sun Microsystems UltraSPARC IV+ may be utilized. In one embodiment, the Ultra-SPARC IV+ processor has two on-chip cores and a shared on-chip L2 cache, and implements the 64-bit SPARC V9 instruction set architecture (ISA) with extensions. The UltraSPARC IV+ processor has two 4-issue in-order superscalar cores. Each core has its own first level (L1) instruction and data caches, both 64 KB. Each core also has its own instruction and data translation lookaside buffers (TLB's). The cores share an on-chip 2 MB level 2 (L2) unified cache. Also shared is a 32 MB off-chip dirty victim level 3 (L3) cache. The level 2 and level 3 caches can be configured to be in split or shared mode. In split mode, each core may allocate in only a portion of the cache. However, each core can read all of the cache. In shared mode, each core may allocate in all of the cache. For ease of discussion, reference may generally be made to such a two-core processor. However, it is to be understood that the methods and mechanisms described herein may be generally applicable to processors with any number of cores.

Figure 2:
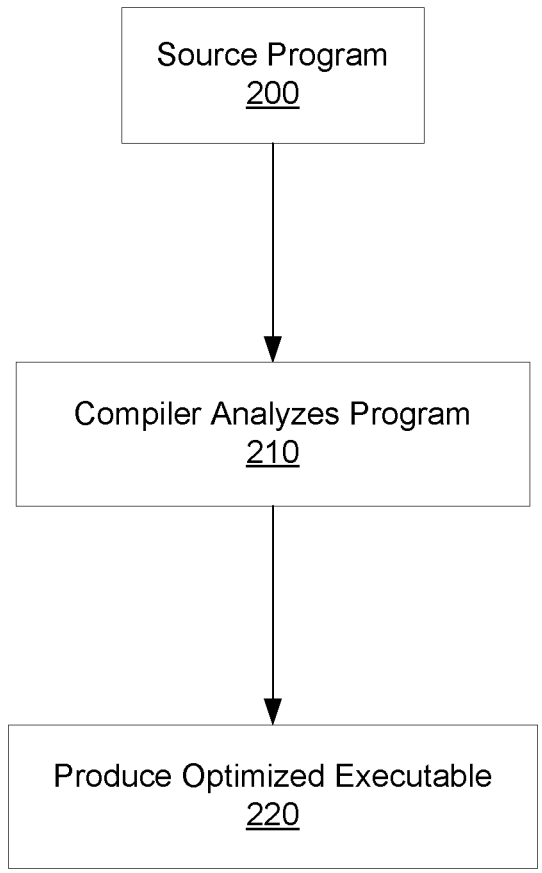
FIG. 2 illustrates one embodiment of a method for compilation.

Modern optimizing compilers have the ability to do a large number of complex optimizations. Some types of optimization are universal and may improve performance in virtually all cases. However, in other cases, the benefit of optimizations, or the manner in which they need to be applied for maximum benefit, depends on the target program's behavior. In order to address optimizations that may depend on a target program's behavior, various approaches have been used. One approach that has been used to optimize code in view of a program's behavior is "static analysis". FIG. 2 depicts one embodiment of the static analysis approach. Using this approach, a source program (block 200) is created. The compiler analyzes the program to determine its behavior and optimizes accordingly (block 210). During the analysis, the compiler determines or guesses at program behavior and makes optimizations. Finally, an optimized executable is produced (block 220).

Figure 3:
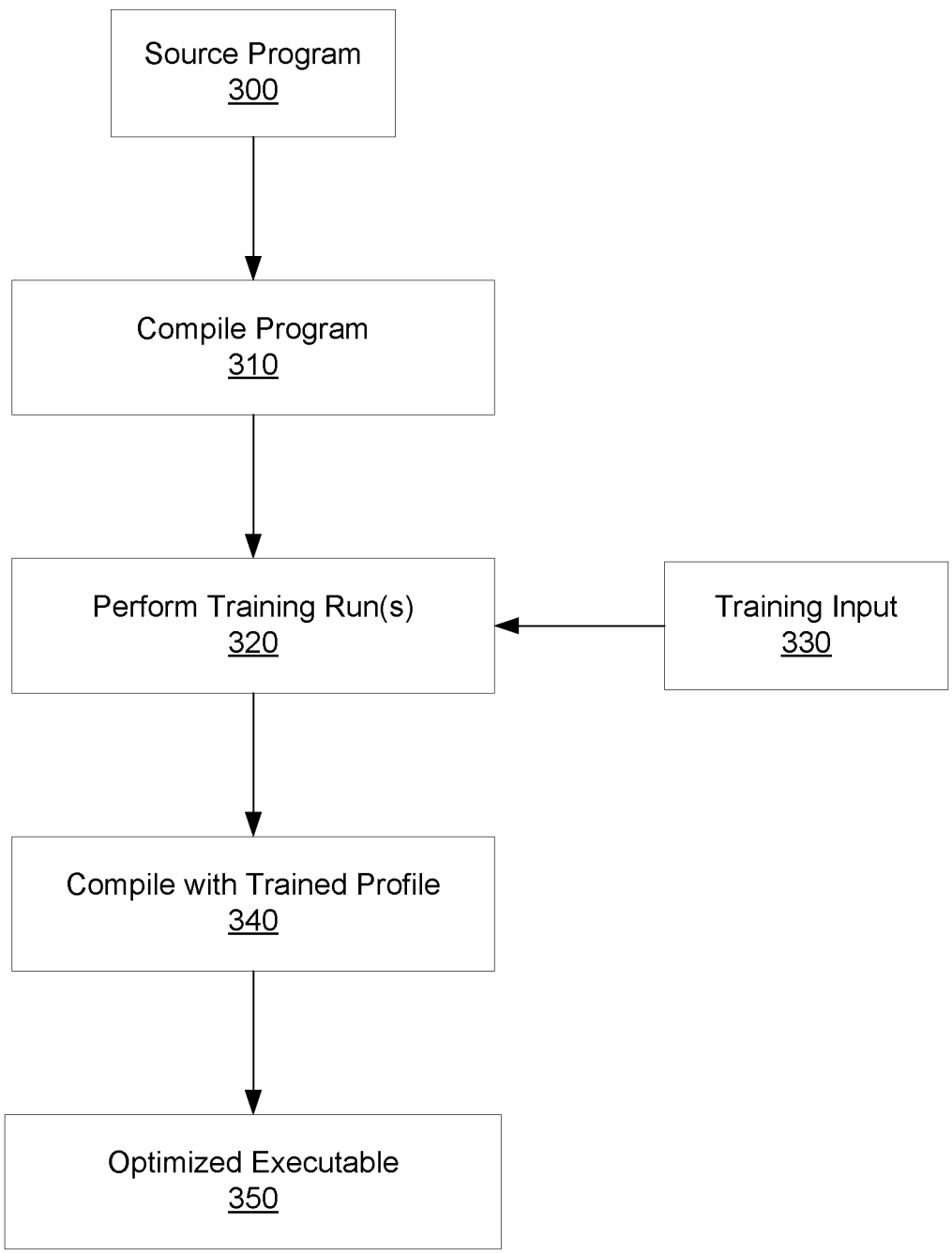
FIG. 3 illustrates one embodiment of a method for compilation.

FIG. 3 depicts another compiler optimization approach sometimes utilized that is referred to as "profile feedback". The profile feedback approach acknowledges some of the deficiencies of the static analysis approach, and utilizes a "training run" to learn about a target program's behavior. Using this approach, developers build a training version of a program. As shown in FIG. 3, a source program is provided (block 300) and compiled (block 310). The resulting executable is built for the sole purpose of training. Training runs are then performed (block 320) using training inputs (block 330).

After training, the source code is re-built (block 340) and a new executable created (block 350) which is optimized based upon the training runs.

Figure 4:
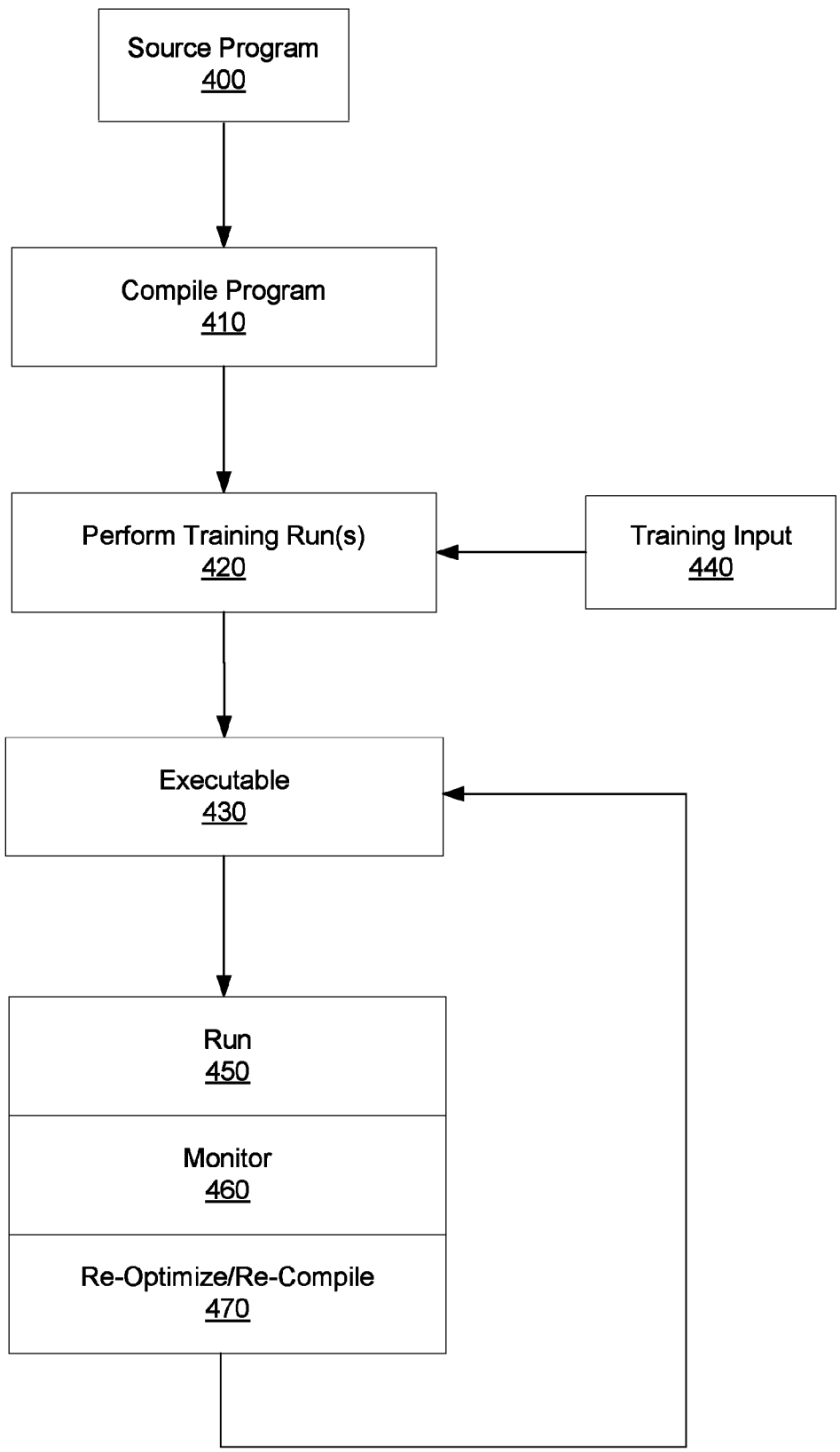
FIG. 4 illustrates one embodiment of a method for compilation.

Yet another approach used for optimizing program code is "run time optimization". Using the run time optimization approach, a program's behavior is monitored during runtime. Based upon the observed behavior, code may be optimized and re-optimized as desired. FIG. 4 illustrates one embodiment of this approach. As shown, a source program (block 400) is compiled (block 410) and training runs may be performed (block 420). Such training runs may utilize training input (block 430). Finally, an executable is produced (block 440). During runtime (block 450), a monitor (block 460) is utilized to monitor the execution. Based upon this runtime monitoring, the code may be re-compiled (block 470) in an effort to further optimize the code. Re-compilation produces a new executable (block 440). The process (450, 460, 470) may then be repeated as desired.

Figure 5:
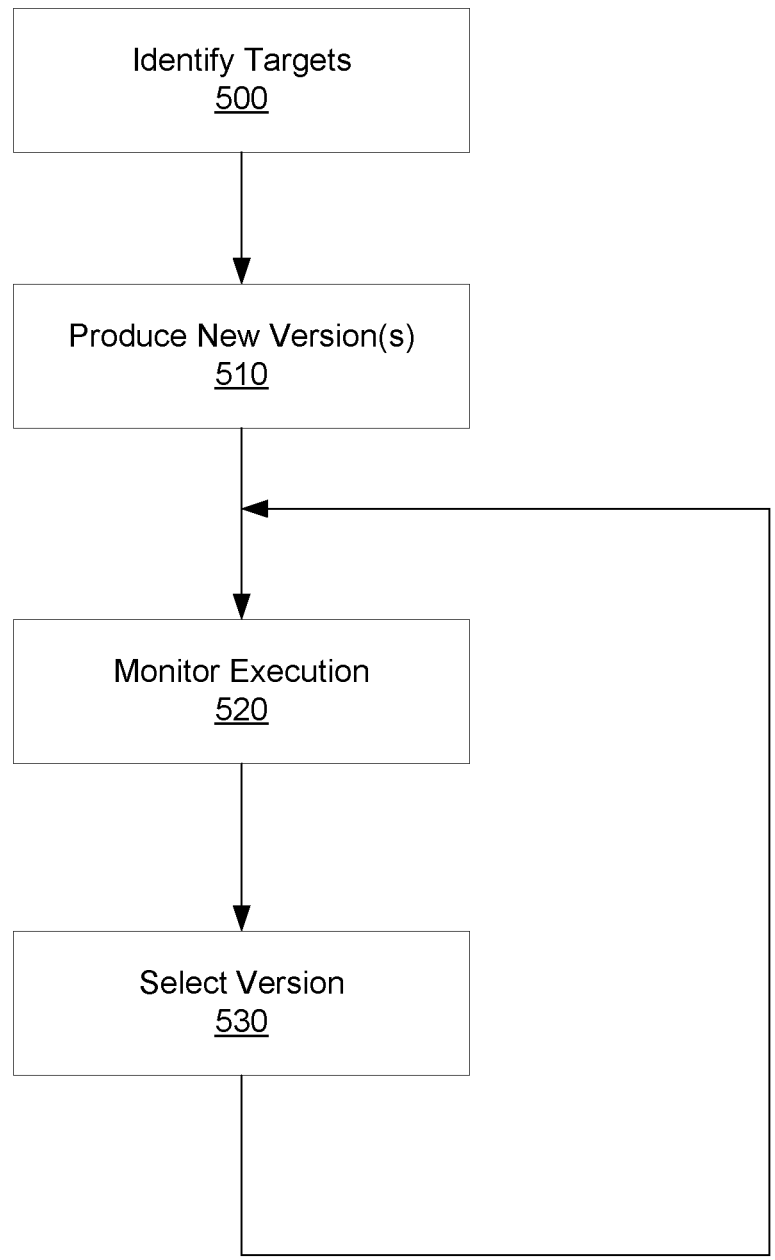
FIG. 5 illustrates one embodiment of a method for dynamically selecting code for execution during runtime.

Turning now to FIG. 5, an overview of one embodiment of a method for producing self-steering code is depicted. Generally speaking, self-steering code is code which is produced in a manner which enables selecting for execution one of two or more portions of code, each of which are designed to perform a given function with differing types of optimization (if any). As shown in the example, the method includes analyzing program code to identify (block 500) one or more "targets" or candidates for optimization. As will be discussed further below, such targets may generally comprise portions of code which lend themselves to one or more optimization techniques—such as loops. Having identified suitable targets, cloned versions of each target may then produced (block 510). Such cloned versions are alternative versions of the corresponding target code which have been optimized or otherwise altered in one way or another. Each of these cloned versions are then included in a compiled version of the code.

In addition to the above cloned version(s), a mechanism is included in the code which allows for selecting among the original and/or other versions during runtime. Additionally, monitoring code may be included which may monitor execution and indicate which of the versions are to be chosen for execution. Having created an executable which includes multiple versions of one or more portions of code, execution and monitoring (block 520) begins. During execution, monitoring may be performed to determine whether a given condition is present. Should the condition be detected, a particular version of a given code portion may be selected for execution. In this manner, runtime optimization may be achieved without requiring recompilation. It is noted that in various embodiments, monitoring may be enabled or disabled as desired. In one embodiment, the monitoring code may itself included as one of the cloned versions.

As discussed above, various approaches have been undertaken to improve application performance by using speculative parallelization of application code. Also discussed above are some of the limitations of such approaches. In the following discussion, both compile time and runtime methods and mechanisms for speculative automatic parallelization are described.

Figure 6:
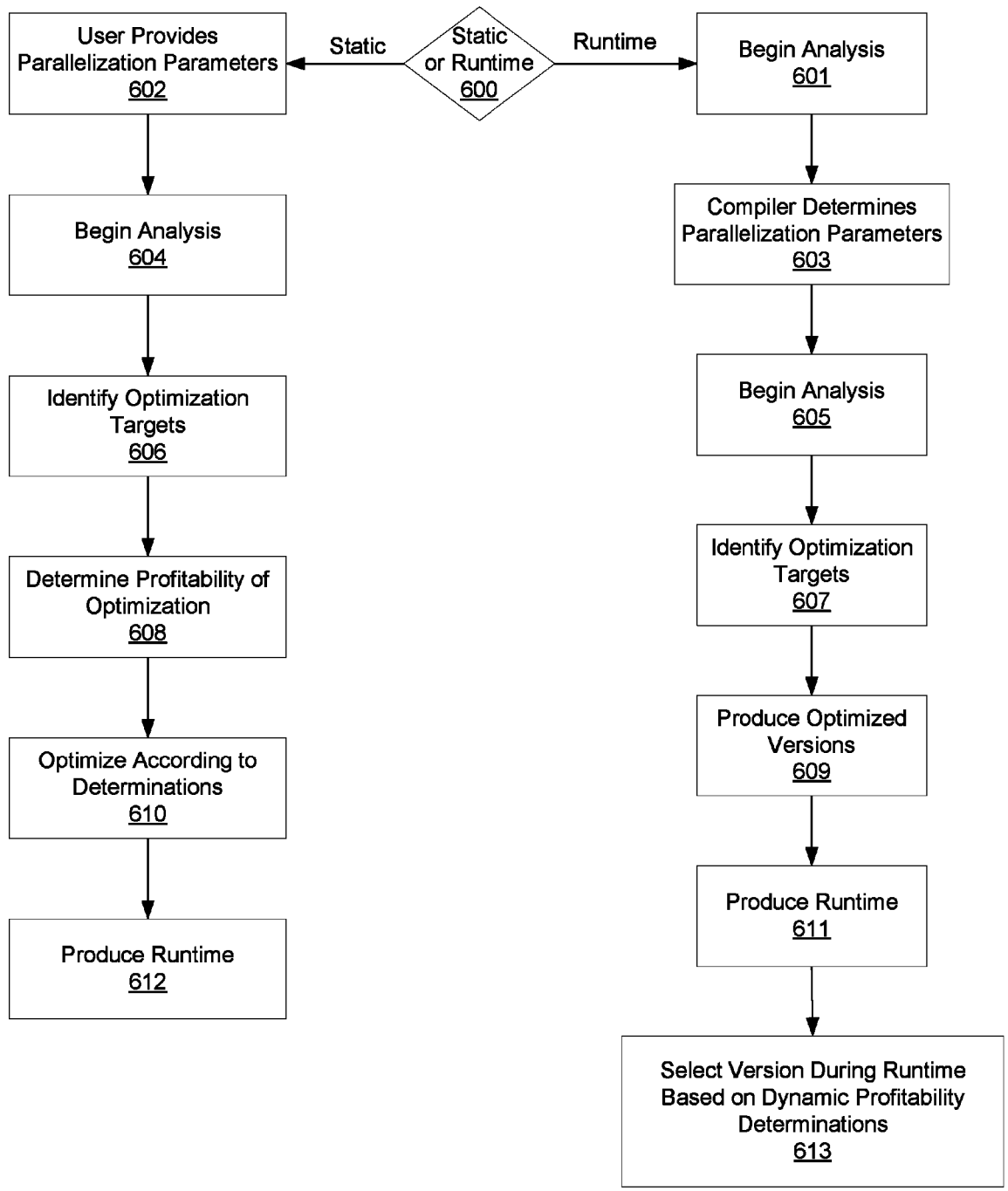
FIG. 6 illustrates one embodiment of a method for static and dynamic optimizations.

Turning now to FIG. 6, an overview of a method is shown whereby compilation of program code may produce an executable corresponding to either static optimization or run time optimization. At some time prior to, or during, the compilation process, a decision (block 600) is made as to whether static or runtime optimization is to be utilized. If static optimization is to be used, parallelization parameters may be provided (block 602) and analysis begun (block 604). During analysis, potential targets (candidates) will be identified for optimization (block 606). Having identified such candidates, an analysis is undertaken to determine the profitability of optimizing a selected candidate (block 608). Based upon the analysis, a given candidate may or may not be optimized. Finally, having completed the desired optimizations, a runtime is created which includes the optimizations.

If, on the other hand, runtime optimization is desired (block 600), analysis of the code may be performed (block 601) and the compiler may itself determine the parallelization parameters (block 603). In this case, the method illustrates compiler determination of parallelization parameters (block 603) rather than user provided parallelization parameters (block 602). However, it is to be understood that various embodiments (whether of the static or runtime approaches) may utilize user provided parameters, compiler determined parameters, or any combination of the two. All such embodiments are contemplated. Having determined suitable parallelization parameters, analysis may be performed (block 605) and candidate targets for optimization identified (block 607). In this embodiment, optimized versions of the identified targets are produced (block 609) according to any of a variety of well known procedures and a runtime is generated (block 611) which includes both the optimized version(s) and non-optimized version(s) (block 611). During execution of the runtime, a version of a given target selected for execution (optimized or non-optimized) is selected dynamically (block 613) and may change during execution.

In the following discussion, a brief overview of one embodiment of a framework for automatic parallelization is provided. In one embodiment, included in the framework is a parallelizing compiler and a parallelization library which may be used for speculative automatic parallelization. Generally speaking, a parallelization compiler may be used to generate parallelized code(s) (e.g., for loops). The parallelization library may generally be used to manage multiple threads, synchronize multiple threads, and provide transaction failure control. While the discussion may refer to the compiler and library as separate entities, they need not in fact be separate. Rather, the parallelization library may, for example, be an integral part of the compiler itself. Numerous such alternatives are possible and are contemplated.

The following example provides a simplified view of code generation and the interaction between the compiler and parallelization library in parallelizing code. Assume the following code represents original source code (or code otherwise subject to compilation):

```
for (i = 1; i <= n; i++)
{
    a[i] = b[i] + foo (i);
}
```

Given the above code, the following parameters may be created and the compiler may replace the above code as shown below. The following parameters may be created and passed to the parallelization library:

```
parameters.lower = 1;
parameters.upper = n;
parameters.step = 1;
parameters.speculative = 1; /* 1 = the loop is speculatively parallelized */
parameters.outlined_func = _outlined_$func1_; /* function name */
parameters.sub_group_size = 0;
/* threads share work with a sub-group size at a time, 0 means ignore */
```

The function "_outlined_$func1_" is the name of an outlined function for the original code/loop and may generally look like the following:

```
_outlined_$func1_ (pass_in_argvs, lower, upper, ...)
    copy_in_a = pass_in_argvs[0];
    copy_in_b = pass_in_argvs[1];
    for (private_i = lower; private_i <= upper; private_i++)
    {
        copy_in_a[private_i] = copy_in_b[private_i] +
        foo (private_i);
    }
    .
    .
    .
```

Arguments that are passed in to the above routine may be as follows:

```
pass_in_argvs[0] = a;
pass_in_argvs[1] = b;
_MasterFunc_spec_ (&parameters, pass_in_argvs, ...)
```

In one embodiment, the function "_MasterFunc_spec_" may be defined in a parallelization library and is configured to partition the original work among multiple threads.

While the above approach may accomplish parallelization of the original code, the above parallelization may not be profitable. For example, the number of iterations "n" may be too small at runtime to overcome the overhead associated with parallelization. Additionally (or alternatively), execution of "foo(i)" may always cause transaction failure. In view of such issues, a scheme is desired to analyze profitability in order to determine whether parallelization should be performed.

In the following discussion, a compile time scheme to control profitability is described. In the following discussion, parallelization will generally refer to speculative parallelization except as otherwise noted or indicated.

Profile feedback is a technique/mechanism used to aid compiler optimizations. Current profile feedback typically collects basic block counts and branch probability of a running program—such an approach may be referred to as edge profiling. Certain profile feedback mechanisms also collect memory access patterns, value patterns for certain expression, and so on. As described herein, a profile feedback collection mechanism is used to collect certain information for speculative automatic parallelization. Generally speaking, compilation in the described approach includes at least 3-steps as illustrated below.

Step 1: Compile the program to collect edge-profiling data and run the program with training inputs. For example, an instrumented version of the program may be compiled and run to produce profiling data. For example, this compilation step may comprise a "collect" mode of compilation to produce selected profiling data during runtime. The instrumented version may then be run with training data to gather profiling data.

Step 2: (Re)Compile and use the collected edge-profiling data to parallelize the program. Run the recompiled version of the program with training inputs to collect certain transaction parallelization statistics. This step will be described in greater detail below.

Step 3: (Re)Compile and use the edge-profiling data, as well as collected transaction parallelization statistics, to parallelize the program. The binary produced is ready to run with real inputs.

In one embodiment, assuming the program is parallelized with existing edge-profiling data, the following information may be collected for each parallelized loop during a run with training inputs:
1. Total number of times when the parallel loop is called; and
2. Total number of times for transaction failure.

This newly collected information may later be fed back to the compiler again for parallelization with better profitability control.

In one embodiment, a compiler may statically determine whether a loop can be profitably speculatively parallelized or not. In order to determine whether a loop should be parallelized, a number of conditions or characteristics of the code may be taken into consideration. For example, in order to be parallelized, a loop should not contain any operation which may cause hardware transaction failure—particularly where such an operation will be executed at every loop iteration. Transaction failure may be due to a variety of reasons. For example, complex microcoded instructions, interrupts, traps, etc., may all lead to transaction failure.

For example, if a special operation (e.g., a divide operation) will cause transaction failure and there exists such an operation in a basic block of the loop which is a control equivalent to the loop header, then parallelization of this loop will be not profitable since during every iteration such a special operation will be executed.

Another example where parallelization may not be profitable relates to cache line issues. Certain hardware may implement transaction monitoring at the granularity of a cacheline. This may pose problems for certain loops if there are multiple arrays referenced with different alignment to the cache line boundary. In such a case, at any given loop iteration, certain array accesses will share the same cache line with another access in another loop iteration.

For certain resource limitations, such as the number of stores executed by each thread to avoid transaction failure, the compiler may compute a sub-group size such that work with such a sub-group size will be shared among threads. This approach may avoid transaction failure if the loop trip count is too large and the loop contains stores. In one embodiment, such a sub-group size may be passed from the compiler to the parallelization library and the parallelization library will partition the work accordingly. In one embodiment, the sub-group size is computed based on estimating how much resource(s) each loop iteration needs and what resource limitations exist within the hardware to avoid transaction failure. For example, hardware buffering may be utilized to store speculative execution results during execution. Were a large loop simply divided according to the number of iterations, the hardware may not be able to buffer all of the intermediate results. Accordingly, partitioning the loop in terms of sub-groups may reduce resource requirements will still achieving improvements in performance.

For example, in one embodiment, the sub-group size may be computed such that maximum parallelism can be reached while no transaction failure will occur. If the sub-group size is less than the number of available threads, not all available threads will be utilized to do useful work at runtime for the given parallel loop. Alternatively, at compile time, the compiler can decide not to parallelize this loop and, alternatively, examine its inner loops.

It is noted that both parallelization and transaction failure have overhead. At compile time, in order to estimate the execution time of the loop, the compiler may estimate loop trip counts and estimate the branch taken probability of each branch inside the loop. If the profile feedback data for edge profiling is available, the compiler may use that information to estimate trip counts and branch probabilities. If such profile feedback is not available, the compiler may perform some static analysis. Alternatively, or in addition, if the compiler cannot make a static determination, it may assign a pre-determined value for trip counts and branch probability. The execution time per iteration for the original loop may then be estimated based on one or more of a cost for each statement, estimated trip counts, and estimated branch probability.

As noted above, in some embodiments the compiler may assign some pre-determined value(s) for parallelization overhead and transaction failure overhead. For example, the estimated original loop execution time (orig_time) may be as follows:

$$orig\_time = est\_exec\_time\_per\_iter * iter\_count;$$

The estimated time for the parallelized loop ($para_{13}time$) may be as follows:

```
para_time = parallelization_overhead +
    (trans_fail_prob *
    ((est_exec_time_per_iter * iter_count) + trans_fail_overhead)) +
    ((1 − trans_fail_prob) *
    est_exec_time_per_iter *
    _ceiling_(iter_count / min(num_threads, sub_group_size)))
```

As the division operation in the above equation may return a floating point number (in particular embodiments), a function like the depicted "ceiling" function (_ceiling_) may be utilized to obtain a corresponding integer value. In one embodiment, _ceiling_(a) returns the next integer number which is equal to or greater than "a". For example, _ceiling_ (1.2) is equal to 2, and _ceiling_(3.0) is equal to 3. Based upon the above equation, in one embodiment if the estimated execution time of the original loop (orig_time) is greater than the estimated execution time of the parallelized loop (para_time) (i.e., it is believed parallelization will be beneficial), then the loop may be speculatively parallelized at compile time. Otherwise, the loop will not be parallelized.

We now turn to a discussion concerning how transaction failure probability (trans_fail_prob) may be determined. If the profile feedback information as described above is available, the trans_fail_prob may be computed as the determined number of transaction failures for the parallelized loop divided by the total number of invocations for the parallel loop.

If, on the other hand, profile feedback information is not available, then the compiler may utilize an algorithm such as the following in order to estimate the transaction failure probability:

First, identify blocks (i.e., code/instruction sequences) such that if those blocks are executed a transaction will fail. Those skilled in the art will appreciate there are a number of techniques for making such an identification. This identified set of such blocks is designated as fail_blocks_set. For example, if a block contains an operation which will cause transaction failure, that block will be included in fail_blocks_set.

Having identified the fail_blocks_set, remove blocks from the fail_blocks_set if they are dominated by some other block in fail_blocks_set. To say that block "a" dominates block "b" means that if block "a" executes at runtime, block "b" is guaranteed to execute at runtime. Therefore, if block a is in fail_blocks_set and dominates block b which is also in fail_blocks_set, then block b may be removed from fail_blocks_set. Removal of dominated blocks avoids double counting.

Finally, compute the transaction failure probability (trans_fail_prob) as the summation of the execution probability of each block in fail_blocks_set.

Figure 7:
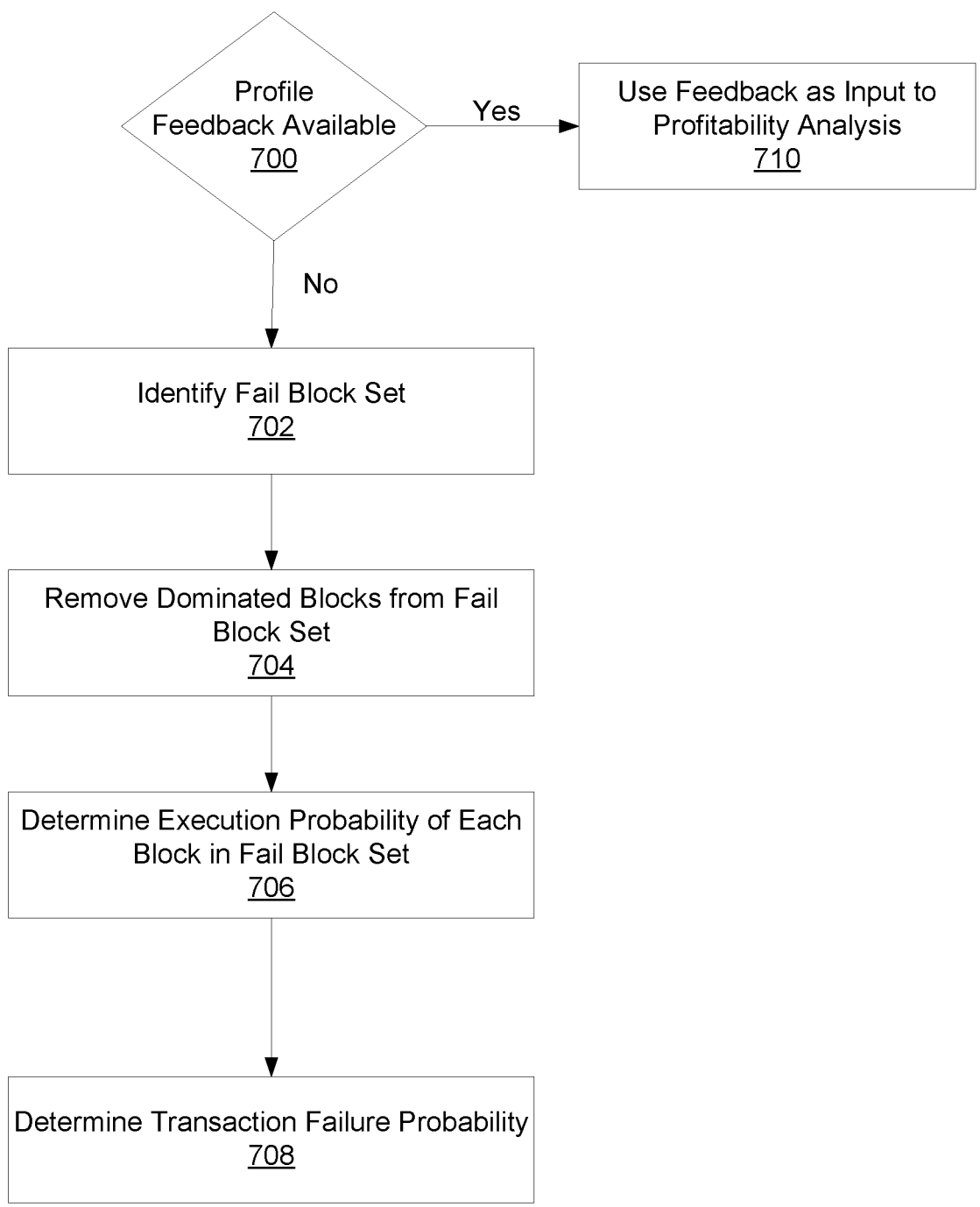
FIG. 7 illustrates one embodiment of a method for performing profitability analysis.

FIG. 7 depicts a method whereby profitability may or may not be based upon profile feedback data. As shown, if profile feedback is in fact available (decision block 700), the feedback may be used as input parameters to the profitability analysis. If no such feedback is available, then a procedure may be utilized for determining parameters for use in the analysis. Such a procedure may generally entail identifying a fail block set (block 702), removing domination blocks from the fail block set (block 704), determining the execution probability of each block in a fail block set (block 706), and determining a transaction failure probability (block 708).

As an example, in the discussion which follows, assume the following definitions:

loop header—The first block of the loop (i.e., within the loop) which is to be executed at runtime whenever the loop is executed.

loop preheader—The block outside the loop which is the immediate predecessor of the loop header.

block_counter—Each block has an associated block_counter. If profile feedback data is available, then in one embodiment block_counter is the number of times the corresponding block is executed with training data. On the other hand, if profile feedback data is not available, the compiler may apply any of a variety of heuristics to assign block_counter values to blocks. For example, the compiler may utilize heuristics which make assumptions about (i) branch probability for each branch, (ii) how many times a loop will be executed, and so on. Utilizing such assumptions, the compiler may then calculate block_counter values for each block in a procedure.

current_loop_header_counter—Each loop has a loop header which is the entry point of the loop. In one embodiment, the block_counter for the loop header is designated the current_loop_header_counter.

current_loop_probability—a measure of the probability that an inner loop will be executed at runtime within the context of the inner loop's outer loop body.

current_loop_preheader_counter—Each loop has a preheader which, as discussed above, is the block immediately preceding the loop header (the first block of the loop). The current_loop_preheader_counter is the block_counter for the loop preheader block of the current loop.

immediate_outer_loop_header_counter—The loop header counter for the immediate outer loop.

As noted above, in one embodiment the transaction failure probability (trans_fail_prob) may be computed as the summation of the execution probability of each block in fail_blocks_set. Using the above definitions, the execution probability of each block may be computed as follows:

(i) block_counter/current_loop_header_counter for the current loop; or (ii) (block_counter/current_loop_header_counter)*current_loop_probability for the immediate outer loop, where the current loop execution probability (current_loop_probability) may be computed as:

current_loop_preheader_counter/immediate_outer_loop_header_counter.

For example, each block may have an associated block_counter. If profile feedback data is available, then block_counter may be the number of times the block is/was executed with training data. On the other hand, if profile feedback data is not available, the compiler may apply some heuristic(s) to assign block_counter values to blocks. In such a case, the compiler may make some assumptions about branch probability for each branch, and how many times a loop will be executed. Using the above assumption, the compiler may then calculate the block_counter value for each block in the procedure. Also, in the above, each loop has a loop header which is the entry point of the loop. The block_counter for the loop header is designated as current_loop_header_counter. The current_loop_probability is a measure of the probability of an inner loop getting executed at runtime in the context of the outer loop body. The current_loop_preheader_counter is the block_counter for the loop preheader block for the current loop. Finally, immediate_outer_loop_header_counter is the loop header counter for the immediate outer loop.

Having obtained the transaction failure probability, the following illustrates one embodiment of an algorithm that may be used by a compiler to determine the profitability of loops in one procedure:

```
<traverse from outer loop to inner loops>
for <each loop>
    if there is an operation which will cause transaction failure in each
    iteration
        <consider the inner loops>
    else if a resource limitation is reached even with one iteration
        <consider inner loops>
    else
        <compute a sub-group size such that resource limitations will not be
        reached with the number of iterations equal to the sub-group size
        divided by number of threads. This sub-group size will be
        iter_count in the algorithm (iter_count appears in both
        orig_time and para_time).>
        <compute trans_fail_prob as discussed above>
        <compute orig_time and para_time according to previous formula.>
        if (para_time < orig_time)
            <parallelize this loop>
        else
            <consider inner loops>
        end if
end for
```

Figure 8:
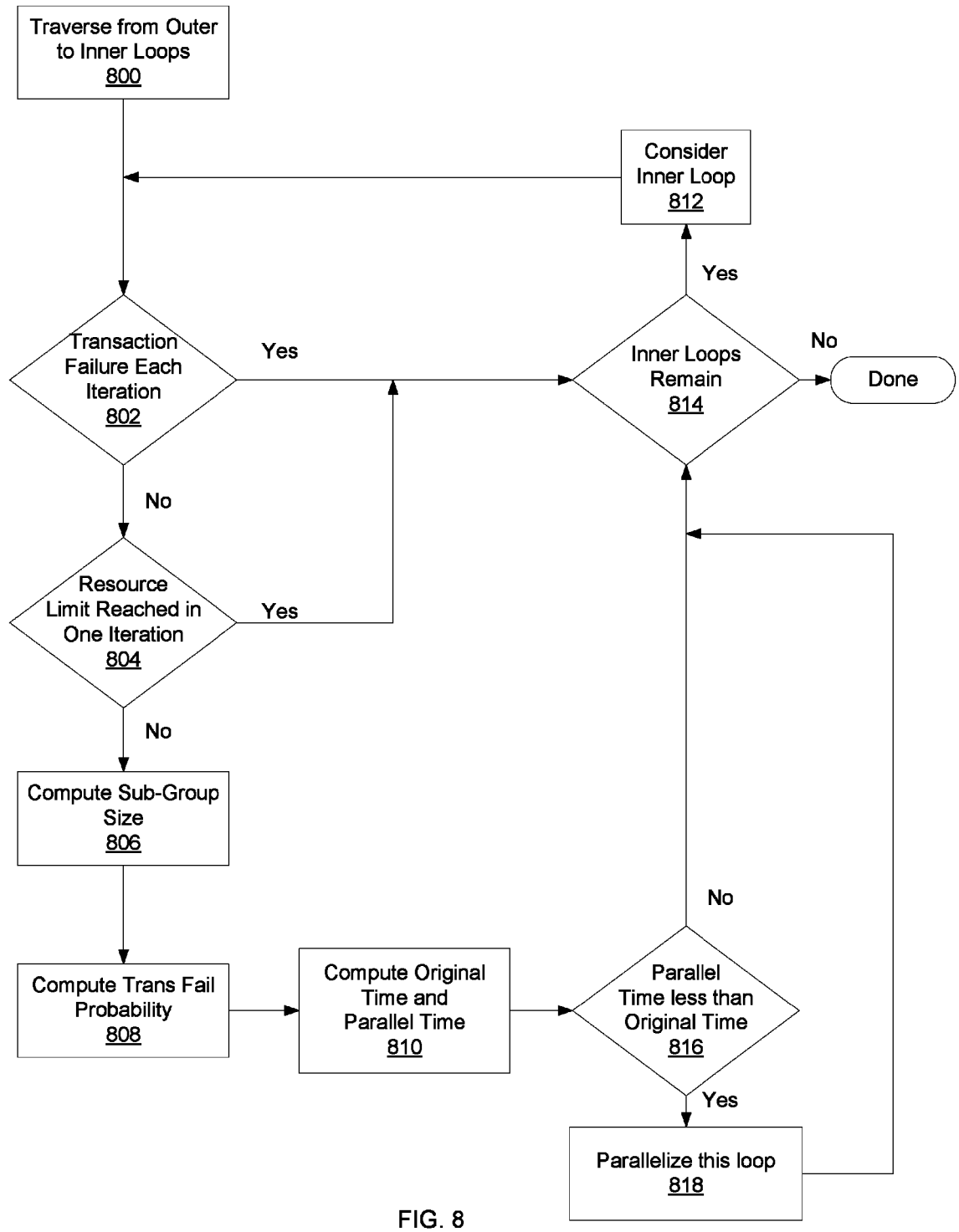
FIG. 8 illustrates one embodiment of a method for performing profitability analysis.

Generally speaking, the compiler may be configured to either traverse selected procedures or traverse all procedures one by one to parallelize the whole program. FIG. 8 illustrates one embodiment of a method for determining the profitability of parallelizing a portion of code such as a loop. As in the above, traversal may be performed from outer to inner loops (block 800). If there is an operation which will cause a transaction failure in each iteration of the loop (decision block 802), and an inner loop remains (decision block 814), then the inner loop is considered (block 812). If there is an operation which will cause a transaction failure in each iteration of the loop (decision block 802), and an inner loop does not remain (decision block 814), then the procedure may be ended.

On the other hand, if there is not an operation which will cause a transaction failure in each iteration of the loop (decision block 802), a determination is made as to whether a resource limit is reached in one iteration (decision block 804). If such a resource limit is reached in one iteration and an inner loop remains (decision block 814), the inner loop is considered (block 812). If such a resource limit is not reached in one iteration, then a sub-group size is computed (block 806) such that resource limitations will not be reached with the number of iterations equal to the sub-group size divided by number of threads.

After computing a sub-group size (block 806), transaction failure probability may be computed (block 808) and both the original and parallelized time may be determined (block 810). If the parallel time is less than the original time, then it may be deemed profitable to parallelize the loop and the loop may be parallelized. If the parallel time is not less than the original time, then it may be deemed un-profitable to parallelize the loop and the loop may not be parallelized. Subsequently, flow may continue to block 814 to determine if inner loops remain.

In the above discussion, embodiments have been discussed wherein a compiler may statically determine whether a loop can be profitably speculatively parallelized or not at compile time. As may be appreciated, such a determination involves estimations which may turn out to be wrong. Consequently, loops may be parallelized when it is not profitable to do so. Similarly, some loops may not be parallelized which could have been done so in a profitable manner. Such errors in compile time determinations may occur, for example, when profile feedback data does not match actual data, or when pre-determined values are different from actual ones. In the following, embodiments are discussed which make profitability determinations at runtime as opposed to compile time.

In the discussion below, the following variables are discussed. In one embodiment, these ten variables are defined for each parallel loop. Generally speaking, the compiler may generate parallelized loops for corresponding serial (non-parallelized) loops and both will exist in the runtime code. For each parallelized loop, the compiler and runtime may have the following ten associated variables:

(1) phase_id

An integer variable that controls when to trigger a re-evaluation as to whether a serial version of a loop should be executed or a parallelized version of the loop should be executed. For example, a re-evaluation may be performed in case of a behavior change of the program.

(2) compare_serial_parallel_time

A variable (e.g., Boolean) which indicates whether at runtime serial time and parallel time should be measured. For example, if measured parallel time is longer than serial time, then parallel version(s) will/should not be executed. In various embodiments, measured times may be normalized to per iteration since trip counts for different invocations may be different.

(3) failure_count; and
(4) failure_rate

The variables failure_count and failure_rate specify other conditions (e.g., threshold values) which may indicate execution of a parallel version is to be stopped, such as in case of transaction failure. If a transaction failure rate of a parallel loop is greater than failure_rate, or the number of transaction failures is greater than failure_count, the loop may be executed in serial mode. In one embodiment, transaction failure rate is equal to the number of invocations with failed transactions divided by the total number of invocation of the parallel loop.

(5) sub_group_size

An integer variable which indicates that each time a sub_group_size of iterations of work is to be done it should be shared among threads. Once a sub_group_size of work is done, the parallelization library should pick another sub_group_size of work (or less if there exists less work than sub_group_size remaining) to be shared among threads, until all the work is done.

The above five variables are user visible variables. That is, users may set the values for the above variables through compiler options, environment variables, or any other suitable means. In contrast, in one embodiment the following variables (6-10) are not user visible.

(6) executed_total_count; &
(7) executed_failure_count

In one embodiment, executed_total_count and executed_failure_count are variables which are internal for each loop and not visible to users. These two variables may be updated each time a parallelized loop is executed at runtime. The variable executed_total_count may be incremented each time the parallelized loop is called, and the variable executed_failure_count may be incremented each time a transaction failure occurs.

(8) compared_serial_$time$
(9) compared_parallel_time

The variables compared_serial_time and compared_parallel_time may also be internal for each loop and not visible to users. In one embodiment, these two variables may be updated with measured normalized serial/parallel time if compare_serial_parallel_time is set. Subsequently, these two variables may be used to decide whether or not a serial version should be executed.

(10) executed_in_serial

This variable, which may be a Boolean variable, indicates that some previous metric already decided that a loop should be executed in serial mode.

As noted above, these ten variables may be defined for each parallel loop. Various implementations are possible. In one embodiment, all variables may be defined as global variables by the compiler and passed to a parallelization library. In an alternative embodiment, a hash table may be included in the parallelization library which uses as a key the name of a function name for a parallel loop. The variable values may then be stored inside the hash table. In this alternative approach, the compiler may avoid the need to create a relatively large number of global variables.

In order for the runtime to control parallelization behavior, the variables phase_id, compare_serial parallel_time, failure_count, failure_rate, sub_group_size may be used. Initialized values (e.g., user determined) for these five variables may be passed to a parallelization library through the compiler on a per loop basis, or they may be set up by an environment variable applied to all loops, or they may be set up by the user through some other option(s). If there are no compiler or user setting of user-visible variables, or none are detected, then either the compiler or the runtime itself may apply heuristics to initialize these variables as discussed below.

For example, if no initial values are provided for one or more of the variables phase_id, compare_serial_parallel_time, failure_count, failure_rate, and sub_group_size, the compiler may be configured to generate such values. In such an embodiment, the compiler may utilize a variety of heuristics including the following:

For each invocation of a routine, the compiler may have a single phase_id.

If at compile time, the estimated parallel execution time is not sufficiently less than the estimated serial time (e.g., the parallel time exceeds 80% of the serial time) the compiler may set compare_serial_parallel_time for that particular loop.

The compiler may set failure_rate equal to the compile-time estimated transaction failure rate.

The compiler may compute sub_group_size to prevent hardware transaction failure by estimating resource requirements for each loop iteration and resource limitations. The sub_group_size may be computed to maximize parallelism while avoiding the cause(s) of transaction failure.

As an alternative to the above compiler based heuristics, if no initial values are provided for one or more of the variables phase_id, compare_serial_parallel_time, failure_count, failure_rate, and sub_group_size, the runtime may be configured to generate such values. For example, the runtime may perform dynamic adjustments by evaluating the reasons for transaction failure(s). For example, if the reason for a transaction failure is due to certain operations and such failures occurred twice consecutively, the runtime may decide to run a serial version of a loop some number of times before resetting to an initial state.

In addition to the above, the runtime may also adjust sub_group_size if the transaction failure reason is due to resource limitations. For example, the runtime may initially set the sub_group size to be half of the loop trip count if the loop fails the transaction. The new value may then take effect for the next invocation.

If the new sub_group size still causes the transaction to fail due to resource limitation, the runtime may reduce the sub_group size by half again. If the transaction does not fail, the sub_group size may stay the same. Other algorithms for adjusting the sub_group size may be used as well.

Given the above discussion, we now turn to example pseudo code which may used for runtime profitability control. In the following, relevant code is shown and some details are omitted for purposes of readability.

```
_MasterFunc_spec_ (...)
executed_total_count = executed_total_count + 1;
execution_in_parallel = 1; /* default to parallel execution */
if (non user or compiler setup of user-visible variables)
{
    /* Added internal variables may be here as desired or needed */
    if (executed_total_count == certain_predefined_value)
    {
        /* reset */
        executed_total_count = 1;
        executed_in_serial = 0;
    }
    else
    {
        if (executed_in_serial) /* (pre)defined by compiler */
        {
            execution_in_parallel = 0; /* do not execute in parallel */
        }
        else if (two consecutive transaction failures due to hitting certain
        operations which always cause transaction failure)
        {
            /* transaction failures detected */
            /* change from parallel to serial execution */
            execution_in_parallel = 0;
            executed_in_serial = 1;
        }
        else if (transaction failure is due to resource limitations)
        {
            /* transaction failure is due to resource limitation */
            /* set the sub_group_size to address resource issues */
            if (sub_group_size == 0) /* first time */
            {
                sub_group_size = current_trip_count/2; /* half loop trip count */
            }
            else if (sub_group_size <= 3)
            {
                /* after dividing sub_group_size by half, only 1 iteration left */
                execution_in_parallel = 0;
                executed_in_serial = 1;
            }
            else
            {
                sub_group_size = sub_group_size / 2; /* divide by half */
            }
        }
    }
}
else if (phase_id <> pass_in_phase_id) /* reevaluation */
{
    /* a phase change */
    executed_total_count = 1; /* reset */
    executed_failure_count = 0;
    compared_parallel_time = 0;
    compared_serial_time = 0;
    executed_in_serial = 0;
}
else
{
    if (executed_in_serial);
    {
        execution_in_parallel = 0;
    }
    else if (executed_failure_count > failure_count)
```

```
            {
                /* change from parallel to serial */
                execution_in_parallel = 0;
                executed_in_serial = 1;
            }
            else if (executed_failure_count/executed_total_count > failure_rate)
            {
                /* change from parallel to serial */
                execution_in_parallel = 0;
                executed_in_serial = 1;
            }
            else if ((compared_parallel_time != 0) &&
                    (compared_serial_time != 0) &&
                    (compared_parallel_time >= compared_serial_time))
            {
                /* change from parallel to serial */
                execution_in_parallel = 0;
                executed_in_serial = 1;
            }
            else if (compare_serial_parallel_time)
            {
                if (compared_parallel_time == 0)
                {
                    execution_in_parallel = 1;
                }
                else if (compared_serial_time == 0)
                {
                    execution_in_parallel = 0;
                }
            }
        }
if (execution_in _parallel) /* executing work in parallel */
{
        if (compare_serial_parallel_time &&
        (compared_parallel_time == 0))
        {
                begin_time = get_current_time_stamp( );
                <execute the work in parallel>
                if (transaction failure does not happen)
                {
                /* normalize parallel execution time per iteration */
                    compared_parallel_time = (get_current_time_stamp( ) –
                        begin_time)/number_of_total_iterations;
                }
                /* Where get_current_time_stamp( ) returns the current time a current time
                stamp value in the running system */
        }
        else
        {
                <execute the work in parallel>
        }
        if (transaction failure happens)
        {
        /* increment transaction failure count */
        executed_failure_count = executed_failure_count + 1;
        }
}
else /* executing work in serial */
{
        if ((executed_in_serial == 0) &&
        compare_serial_parallel_time &&
        (compared_serial_time == 0))
        {
                begin_time = get_current_time_stamp ( );
                <execute the work in serial>
                /* normalize serial execution time per iteration */
                compared_serial_time = (get_current_time_stamp( ) – begin_time ) /
                    number_of_total_iterations;
        }
        else
        {
                <execute the work in serial>
        }
}
```

Figure 9:
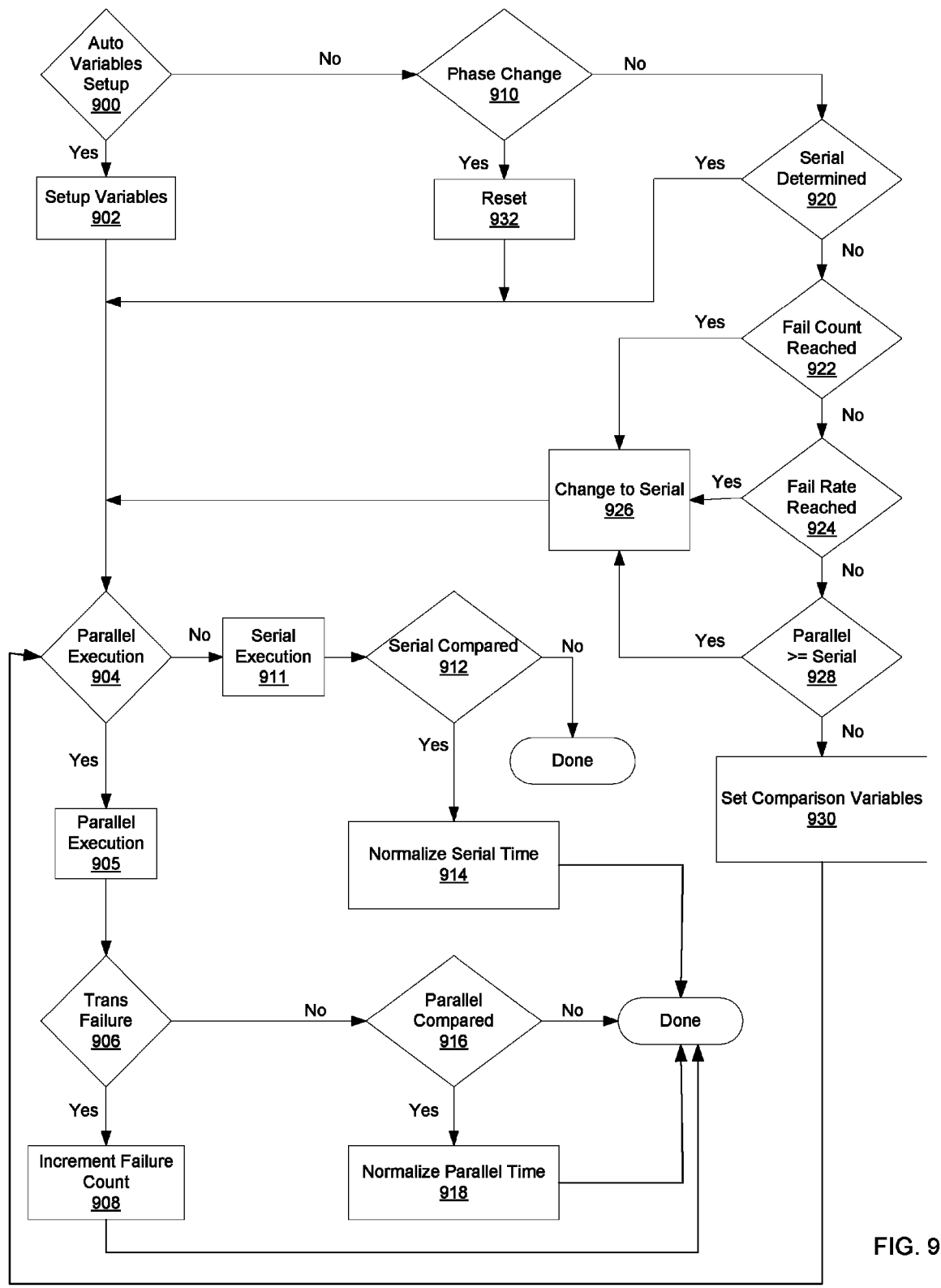
FIG. 9 illustrates one embodiment of a method for selecting between optimized and non-optimized code execution during runtime execution.

Using the above pseudo code as a guide, FIG. 9 illustrates one embodiment of a method for runtime profitability control. In the example shown, if no initial values are provided (decision block 900) for selected variable (such as phase_id, compare_serial_parallel_time, failure_count, failure_rate, and sub_group_size) the compiler may be configured to generate such values (block 902). Otherwise, if a phase change is determined (decision block 910), then a reset to an initial state may be performed (block 932). If no phase change is determined, then a determination is made as to whether serial execution has been established (decision block 920). If serial execution has been determined, then flow proceeds to block 904. Otherwise, flow proceeds to block 922. In blocks 922 and 924, it is determined whether a given fail count or fail rate has been reached, if the fail count or fail rate has been reached, then a change to serial execution is determined and flow proceeds to block 904. If neither of the fail count nor fail rate has been reached, but the parallel execution time exceeds that of the serial execution time (decision block 928), then a change to serial mode is determined (block 926). If the parallel time does not exceed the serial time (decision block 928), then the comparison variable may be set (block 930) as discussed above.

If in block 904, parallel execution has been determined, then parallel execution is established (block 905). If then a transaction failure is detected (decision block 906), then a fail count may be incremented (block 908). If in block 906 no transaction failure is detected and an indication to set the compare parallel time variable is detected (decision block 916), then the parallel runtime may be determined (block 918). The parallel runtime may be normalized. If in block 904 parallel execution has not been determined, then serial execution is established (block 911). If an indication to set the compare serial time variable is detected (decision block 912), then the serial runtime may be determined (block 914). The serial runtime may be normalized.

Figure 10:
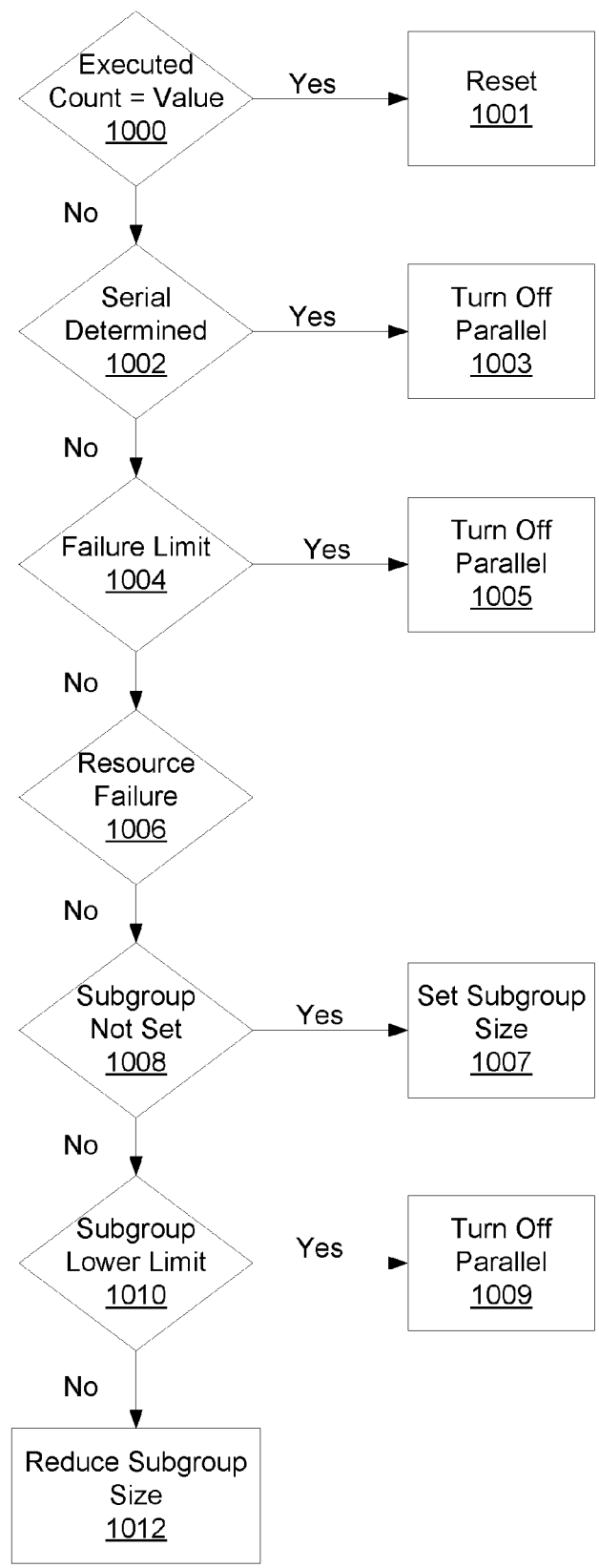
FIG. 10 illustrates one embodiment of a method for establishing optimization variables.

As noted above in FIG. 9, particular values may be determined by the compiler if not already provided (block 902). FIG. 10 illustrates one embodiment of a method for establishing a variety of values. In decision block 1000, if some predetermined number of executions of a given portion of code have occurred, then a reset of values may be performed (block 1001). If the count has not been reached and serial execution mode has been determined (decision block 1002), then parallel execution mode is turned off (block 1003). If serial execution mode has not been determined, but a failure limit has been reached (decision block 1004), then parallel execution mode is turned off.

If a resource failure is detected (decision block 1006) and a subgroup size has not been set (decision block 1008), then a sub-group size is set (block 1009). If the sub-group size has reached a lower limit (decision block 1010), then parallel execution is turned off (block 1011). If in block 1006 a resource failure is not detected, then parallel execution is turned off (block 1007). Finally, if the lower limit on a sub-group size has not been reached in block 1010, then the sub-group size may be reduced (block 1012).

Figure 11:
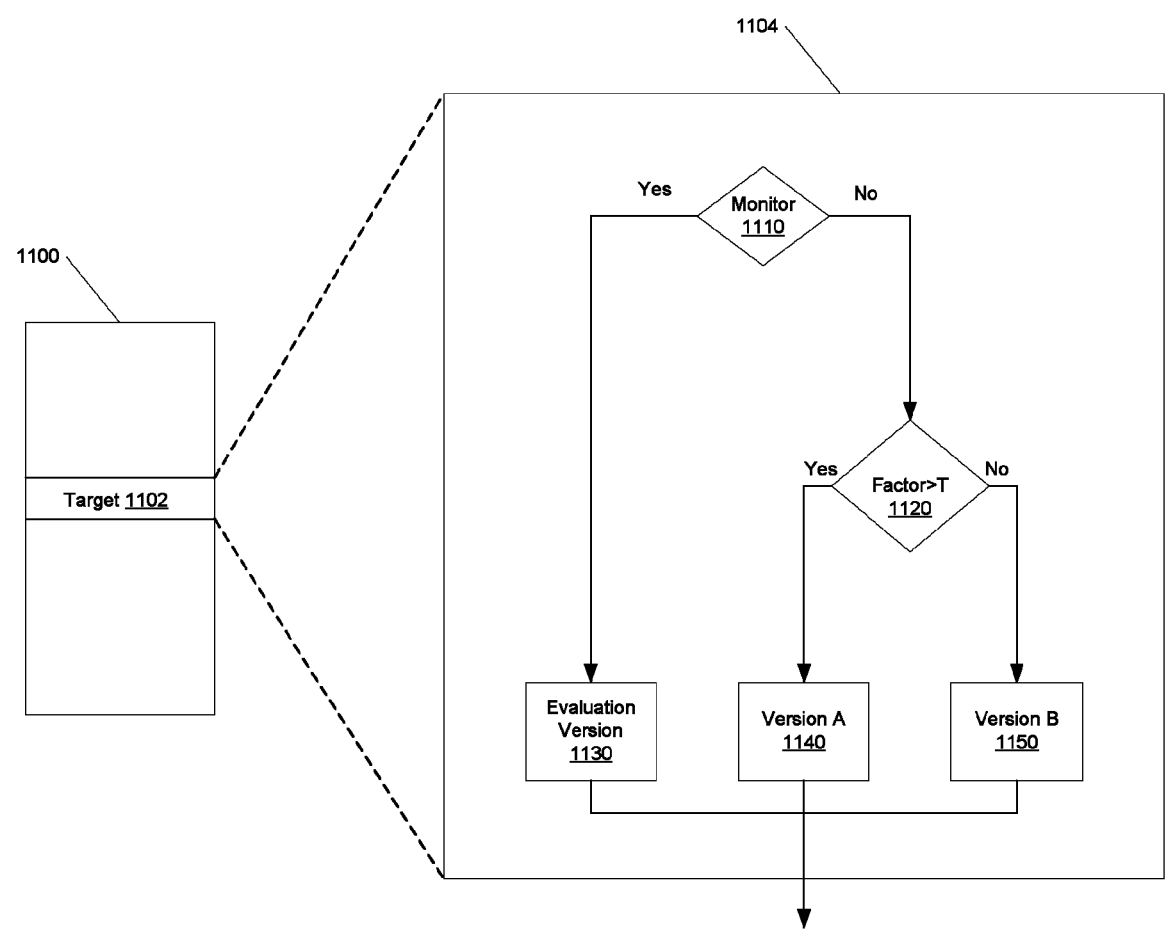
FIG. 11 illustrates one embodiment of a method for monitoring code execution and selecting from a plurality of alternative portions of code.

Turning now to FIG. 11, one embodiment of the operation of dynamic selection of code is shown. In the example shown, program code 1100 has been modified to include code with original loops, parallelized loops, and monitoring/evaluation code. During the analysis and compilation process, target code 1102 was identified as a candidate for parallelization. Block 1104 depicts control flow of the target code 1102. As shown, code (decision block 1110) has been introduced which enables monitoring/evaluation to be either enabled or disabled. If monitoring is enabled, then a monitoring version (block 1130) of the target code 1102 is executed during runtime. Such a monitoring version 1130 could, for example, represent an un-parallelized loop 1102. During monitoring/evaluation, one or more factors or conditions may be monitored for the target code 1102. For example, an execution time of an un-parallelized loop versus a parallelized loop may be determined.

After evaluation, a determination may be made as to which of two or more versions of the code 1102 are to be utilized. The decision (decision block 1120) as to which version is used may be based upon data resulting from previous evaluation. For example, the decision may be made based upon whether a monitored factor (e.g., transaction failure rate) exceeds some threshold (T). If the condition is met (i.e., Factor>T), then one version (1140) of the code 1102 may be used. If the condition is not met, then a different version (1150) of the code 1102 may be used. In this manner, different versions of program code may be utilized depending upon the behavior of the program, and without re-compilation of the program.

Figure 12:
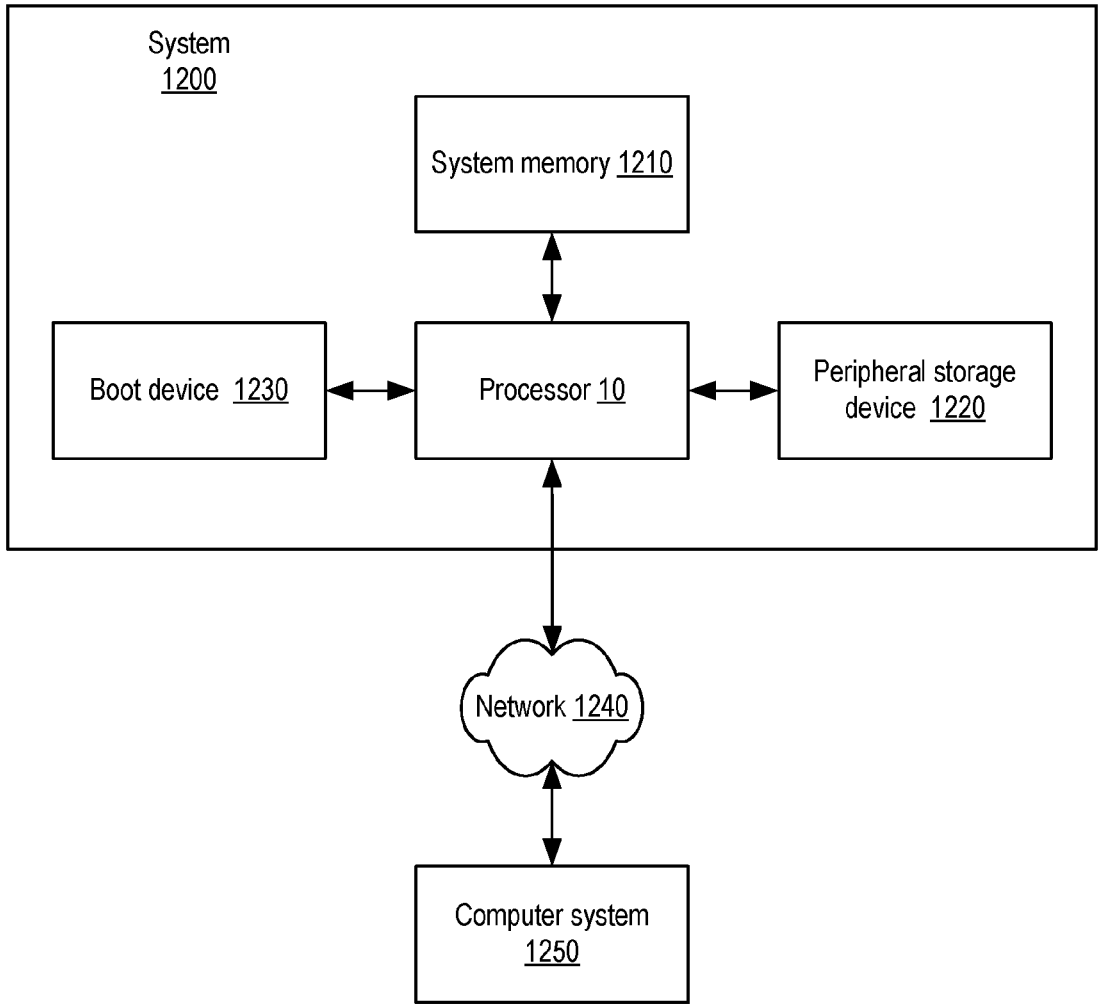
FIG. 12 is a block diagram illustrating one embodiment of a computing system.

As described above, in some embodiments processor 10 of FIG. 1 may be configured to interface with a number of external devices. One embodiment of a system including processor 10 is illustrated in FIG. 12. In the illustrated embodiment, system 1200 includes an instance of processor 10 coupled to a system memory 1210, a peripheral storage device 1220 and a boot device 1230. System 1200 is coupled to a network 1240, which is in turn coupled to another computer system 1250. In some embodiments, system 1200 may include more than one instance of the devices shown, such as more than one processor 10, for example. In various embodiments, system 1200 may be configured as a rack-mountable server system, a standalone system, or in any other suitable form factor. In some embodiments, system 1200 may be configured as a client system rather than a server system.

In various embodiments, system memory 1210 may comprise any suitable type of system memory as described above, such as FB-DIMM, DDR/DDR2 SDRAM, or RDRAM®, for example. System memory 1210 may include multiple discrete banks of memory controlled by discrete memory interfaces in embodiments of processor 10 configured to provide multiple memory interfaces 130. Also, in some embodiments system memory 1210 may include multiple different types of memory.

Peripheral storage device 1220, in various embodiments, may include support for magnetic, optical, or solid-state storage media such as hard drives, optical disks, nonvolatile RAM devices, etc. In some embodiments, peripheral storage device 1220 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1230 may include a device such as an FPGA or ASIC configured to coordinate initialization and boot of processor 10, such as from a power-on reset state. Additionally, in some embodiments boot device 1230 may include a secondary computer system configured to allow access to administrative functions such as debug or test modes of processor 10.

Network 1240 may include any suitable devices, media and/or protocol for interconnecting computer systems, such as wired or wireless Ethernet, for example. In various embodiments, network 1240 may include local area networks (LANs), wide area networks (WANs), telecommunication networks, or other suitable types of networks. In some embodiments, computer system 1250 may be similar to or identical in configuration to illustrated system 1200, whereas in other embodiments, computer system 1250 may be substantially differently configured. For example, computer system 1250 may be a server system, a processor-based client system, a stateless "thin" client system, a mobile device, etc.

It is noted that the above described embodiments may comprise software. In such an embodiment, the program instructions which implement the methods and/or mechanisms may be conveyed or stored on a computer accessible medium.

Numerous types of media which are configured to store program instructions are available and include hard disks, floppy disks, CD-ROM, DVD, flash memory, programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for compilation comprising:
   analyzing source code;
   identifying candidate code for parallelization, wherein said candidate code comprises a loop;
   determining a profitability of parallelizing the candidate code, wherein determining the profitability comprises:
      computing an execution time of a parallelized version of the loop without executing a parallelized version of the loop; and
      computing an execution time of a non-parallelized version of the loop;
   parallelizing the loop, in response to determining the execution time of a parallelized version of the loop is less than the execution time of a non-parallelized version of said loop by at least a given amount; and
   forgoing parallelization of the loop, in response to determining the execution time of said parallelized version is not less than the execution time of the non-parallelized version of said loop by at least the given amount.

2. The method of claim 1, further comprising forgoing parallelization of said loop, in response to determining said loop comprises a transaction that will fail on each iteration of the loop.

3. The method of claim 1, wherein analyzing said code comprises traversing identified loops from outer loops to inner loops.

4. The method of claim 3, further comprising receiving as input profiling feedback data corresponding to said source code prior to said analyzing.

5. The method of claim 3, further comprising generating input for use in said analyzing, wherein said generating comprises:
   identifying a fail block set;
   removing dominated blocks from the fail block set to create a reduced fail block set; and
   considering code of said reduced fail block set to be one or more candidates for parallelization.

6. The method of claim 1, wherein in response to determining said loop does not comprise a transaction that will fail on each iteration of the loop, the method further comprises:
   forgoing parallelization of said loop, in response to determining a resource limitation will be reached on a single iteration of said loop; and
   computing a sub-group size, in response to determining a resource limitation will not be reached on a single iteration of said loop, such that work with such a sub-group size will be shared among a plurality of threads.

7. A computer readable storage medium comprising program instructions operable for compilation, wherein the program instructions are executable to:
   analyze source code;
   identify candidate code for parallelization, wherein said candidate code comprises a loop;
   determine a profitability of parallelizing the candidate code, wherein to determine the profitability the program instructions are operable to:
      compute an execution time of a parallelized version of the loop without executing a parallelized version of the; and
      compute an execution time of a non-parallelized version of the loop;
   parallelize the loop, in response to determining the execution time of a parallelized version of the loop is less than the execution time of a non-parallelized version of said loop by at least a given amount; and
   forgo parallelization of the loop, in response to determining the execution time of said parallelized version is not less than the execution time of the non-parallelized version of said loop by at least the given amount.

8. The computer readable storage medium of claim 7, wherein the program instructions are further executable to forgo parallelization of said loop, in response to determining said loop comprises a transaction that will fail on each iteration of the loop.

9. The computer readable storage medium of claim 7, wherein analyzing said code comprises traversing identified loops from outer loops to inner loops.

10. The computer readable storage medium of claim 9, wherein the program instructions are further executable to receive as input profiling feedback data corresponding to said source code prior to said analyzing.

11. The computer readable storage medium of claim 9, wherein the program instructions are further executable to generate input for use to analyze the source code, wherein to generate the input the program instructions are executable to:
   identify a fail block set;
   remove dominated blocks from the fail block set to create a reduced fail block set; and
   consider code of said reduced fail block set to be one or more candidates for parallelization.

12. The computer readable storage medium of claim 7, wherein in response to determining said loop does not comprise a transaction that will fail on each iteration of the loop, the program instructions are executable to:
   forgo parallelization of said loop, in response to determining a resource limitation will be reached on a single iteration of said loop; and
   compute a sub-group size, in response to determining a resource limitation will not be reached on a single iteration of said loop, such that work with such a sub-group size will be shared among a plurality of threads.

13. A computing system comprising:
a processor;
a storage medium configured to store application source code; and
a storage medium comprising program instructions, wherein the program instructions are executable by the processor to:
analyze said source code;
identify candidate code of the source code for parallelization, wherein said candidate code comprises a loop;
determine a profitability of parallelizing the candidate code, wherein to determining the profitability the program instructions are executable to:
compute an execution time of a parallelized version of the loop without executing a parallelized version of the candidate code; and
compute an execution time of a non-parallelized version of the loop;
parallelize the loop, in response to determining the execution time of a parallelized version of the loop is less than the execution time of a non-parallelized version of said loop by at least a given amount; and
forgo parallelization of the loop, in response to determining the execution time of said parallelized version is not less than the execution time of the non-parallelized version of said loop by at least the given amount.

14. The computing system of claim 13, wherein the program instructions are further executable to forgo parallelization of said loop, in response to determining said loop comprises a transaction that will fail on each iteration of the loop.

15. The computing system of claim 1, wherein determining the profitability further comprises computing a probability of transaction failure for the candidate code.

* * * * *

UNITED STATES PATENT AND TRADEMARK OFFICE
CERTIFICATE OF CORRECTION

PATENT NO. : 8,677,337 B2  
APPLICATION NO. : 12/113716  
DATED : March 18, 2014  
INVENTOR(S) : Song et al.

Page 1 of 1

It is certified that error appears in the above-identified patent and that said Letters Patent is hereby corrected as shown below:

In the Claims:

Claim 7, Column 22, Line 27, please delete "the; and" and substitute -- the loop; and --

Signed and Sealed this  
Third Day of June, 2014

Michelle K. Lee  
*Deputy Director of the United States Patent and Trademark Office*